United States Patent [19]

Harada et al.

[11] Patent Number: 5,087,654
[45] Date of Patent: Feb. 11, 1992

[54] POLYPROPYLENE RESIN COMPOSITION

[75] Inventors: Hiroyuki Harada; Kenichi Ohkawa; Masashi Yamamoto, all of Ichihara; Minoru Yoshinaka, Higashiosaka; Jun Yagi, Hirakata; Kouziro Matsuo, Yamatokoriyama, all of Japan

[73] Assignees: Sumitomo Chemical Company, Limited; Matsushita Electric Industrial Co., Ltd., both of Osaka, Japan

[21] Appl. No.: 478,508

[22] Filed: Feb. 12, 1990

[30] Foreign Application Priority Data

Feb. 21, 1989 [JP] Japan .................. 1-042172

[51] Int. Cl.$^5$ .................. C08K 3/22
[52] U.S. Cl. .................. 524/432; 524/504
[58] Field of Search .................. 524/432, 504

[56] References Cited

U.S. PATENT DOCUMENTS

| | | | |
|---|---|---|---|
| 3,745,142 | 7/1973 | Mahlman | 524/432 |
| 4,420,580 | 12/1983 | Herman et al. | 524/424 |
| 4,506,056 | 3/1985 | Gaylord | 524/445 |
| 4,764,546 | 8/1988 | Mitsuno | 524/504 |

FOREIGN PATENT DOCUMENTS 0325797 8/1989 European Pat. Off. .
55-118940 9/1980 Japan .

Primary Examiner—Paul R. Michl
Assistant Examiner—Edward J. Cain
Attorney, Agent, or Firm—Stevens, Davis, Miller & Mosher

[57] ABSTRACT

Disclosed is a polypropylene resin composition which is superior in mechanical strength and affords molded articles having good appearance which comprises (A) a crystalline polypropylene, (B) a polypropylene modified with an unsaturated carboxylic acid or an acid anhydride thereof, and (C) a zinc oxide whiskers. When the composition additionally contains an inorganic filler such as glass fibers, molded articles further improved in appearance can be obtained. The zinc oxide whiskers preferably have a tetrapod type crystal structure.

2 Claims, No Drawings

5,087,654

POLYPROPYLENE RESIN COMPOSITION

BACKGROUND OF THE INVENTION

The present invention relates to a polypropylene resin composition which is excellent in mechanical strength, especially rigidity at high temperature and breaking strength of a weld portion (which is a portion where molten resin which flows from two or more directions weld with each other) and which can give good appearance to a molded article.

Hitherto, various resin compositions have been proposed which have been improved in rigidity and heat resistance by incorporating fillers such as talc, mica, glass fiber and calcium carbonate in polypropylene resin, but these compositions are generally inferior in breaking strength of a weld portion as compared with that of a non-weld portion.

For instance, glass fiber-reinforced polypropylene resins (hereinafter referred to as "FRPP") are generally extremely inferior in impact strength, especially of a weld portion and besides, it is difficult to obtain molded articles of good appearance therefrom. Therefore, in many cases, these resins cannot be applied to instrument panels of cab internal parts or functional structural parts in the engine compartment of an automobile, though excellent heat resistance is exhibited.

SUMMARY OF THE INVENTION

The object of the present invention is to provide a polypropylene resin composition which is excellent in breaking strength and can afford good appearance for molded articles.

The inventors have found that a resin composition which comprises a crystalline polypropylene, a polypropylene modified with an unsaturated carboxylic acid or acid anhydride thereof, and a zinc oxide whisker, especially zinc oxide having tetrapod type crystal structure which is subjected to surface treatment with a silane compound in specific amounts has excellent breaking strength of a weld portion and besides can provide good appearance for molded articles. They have further found that FRPP which can provide a molded article having good appearance can be obtained by incorporating glass fibers therein. Thus, the present invention has been accomplished.

DESCRIPTION OF THE INVENTION

The present invention relates to a polypropylene resin composition which comprises (A) crystalline polypropylene, (B) polypropylene modified with unsaturated carboxylic acid or acid anhydride thereof, (C) zinc oxide whiskers, and, if necessary, (D) inorganic filler.

The crystalline polypropylene used in the present invention includes, for example, polypropylene and propylene-ethylene copolymer.

The polypropylene modified with unsaturated carboxylic acid or acid anhydride thereof has no special limitation and any known ones can be used. Examples thereof are copolymers or graft copolymers of polypropylene such as polypropylene homopolymers and ethylenepropylene copolymers with unsaturated carboxylic acids or acid anhydrides thereof having acid or acid anhydride unit such as acrylic acid, methacrylic acid, maleic acid, itaconic acid, fumaric acid, maleic anhydride, and itaconic anhydride. Especially preferred are copolymers or graft copolymers of polypropylene with acrylic acid or maleic anhydride.

The zinc oxide whiskers used in the present invention comprises nucleus portion and needle crystal portion which extends from the nucleus portion in different axial directions and it is preferred that diameter of base portion of the needle crystal portion is 0.7-14 μm and length from the base portion to tip of the needle crystal portion is 3-200 μm. Especially preferred is one which has tetrapod like crystal structure comprising needle crystal portion which extends in four axial directions.

The zinc oxide whiskers are preferably subjected to surface treatment with a silane compound. As the surface treating agent, there may be used at least one agent selected from epoxysilanes such as β-(3,4-epoxycyclohexyl)-ethyltrimethoxysilane and γ-glycidoxypropyltrimethoxysilane, vinylsilanes such as vinyltriethoxysilane and vinyltrichlorosilane, and aminosilanes such as γ-aminopropyltriethoxysilane and N-β-(aminoethyl)-γ-aminopropyltrimethoxysilane. The surface treatment is usually carried out by immersing the whiskers in a solution of the surface treating agent silane compound and then drying the immersed whiskers. If necessary, carboxylic acid may be used in combination with the silane compound.

The reason why the resin composition which contains the zinc oxide whiskers according to the present invention exhibits excellent breaking strength of weld portion and affords good appearance for molded articles is not necessarily clear, but it is considered that bonding power of a weld portion is high due to the tetrapod type crystal structure of the filler which is different from needle or flaky crystal structure and appearance of molded article is improved because the filler hardly comes in contact with surface of the composition at the time of orientation of the filler.

The inorganic fillers such as glass fiber used in the composition of the present invention are, if necessary, subjected to surface treatment with a silane compound.

In the present invention, it is necessary to disperse as uniformly as possible the above-mentioned crystalline polypropylene, modified polypropylene, zinc oxide whiskers and inorganic filler such as glass fibers. For this purpose a Banbury mixer, screw extruder, roll mill, or the like can be used. Furthermore, the composition of the present invention may further contain various customarily used additives, for example, stabilizers such as antioxidant and ultraviolet absorber, pigments, inorganic fillers, and ethylene-olefin rubber polymers.

The composition according to the present invention can be suitably used as automobile parts, especially, internal trim parts such as for instrument panels and console boxes, internal parts of an engine compartment such as fan shroud and radiator grill, and exterior trim parts such as bumpers, fenders and wheel caps.

The present invention will be explained in more detail by the following examples and comparative examples.

Examples 1–4 and Comparative Examples 1–3

The following components were used.
Crystalline polypropylene (A):
A-1: $[\eta]=2.0$, ethylene content $=0\%$
A-2: $[\eta]=2.0$, ethylene content $=5.5\%$
A-3: $[\eta]=1.8$, ethylene content $=0\%$
Polypropylene (B) modified with maleic acid:
B-1: Maleic acid content $=0.1\%$
Zinc oxide whisker (C):
C-1: Treated with silane Inorganic filler (D):
D-1: Glass fiber RES03-TP74 manufactured by Japan Glass Fiber Co.
D-2: Talc of 3.5 μm in average particle diameter.

These components in the amounts as shown in Table 1 were mixed together with antioxidant by a powder mixer for 2 minutes and pellets were prepared from the mixture at 200° C. by a vented screw extruder (twin-screw of 44 mmΦ).

The resulting composition was molded into a desired test piece under the injection molding conditions of resin temperature: 220° C., pressure: 870 kg/cm², and total cycle: 60 seconds and the test piece was subjected to tests on properties.

The properties were measured by the following methods.

(1) Flexural modulus: JIS K7203
(2) Izod impact strength: JIS K7110
(3) Tensile break strength: ASTM-D638

Test pieces for measurement of tensile strength of a weld portion were provided with gates at both ends and a weld portion at center.

The results are shown in Table 1 as those of Examples 1-4 and Comparative Examples 1-3.

It is clear from comparison of Examples 1 and 2 with Comparative Example 1 that the samples of Examples 1 and 2 containing crystalline polypropylenes A-1 and A-2 and zinc oxide whiskers C-1 were superior in breaking strength of the weld portion. Furthermore, it is clear from comparison of Examples 3 and 4 with Comparative Example 3 that the samples of Examples 3 and 4 containing crystalline polypropylene A-3, inorganic filler D-1 and zinc oxide whiskers C-1 had superior appearance.

According to the resin composition containing the zinc oxide of the present invention, molded products of excellent breaking strength and good appearance can be obtained and polypropylene resin composition having such excellent characteristics is especially suitable for use as automobile parts, especially, functional parts materials of internal trim parts, parts in an engine compartment and exterior trim parts.

TABLE 1

|  | Example 1 | Example 2 | Example 3 | Example 4 | Comparative Example 1 | Comparative Example 2 | Comparative Example 3 |
|---|---|---|---|---|---|---|---|
| Composition (% by weight) | | | | | | | |
| Crystalline polypropylene (A) | A-1 55 | A-2 65 | A-3 65 | A-3 65 | A-2 80 | A-3 85 | A-3 70 |
| Modified polypropylene (B) | B-1 15 | B-1 15 | B-1 15 | B-1 15 | B-1 — | B-1 15 | B-1 15 |
| Zinc oxide whiskers (C) | C-1 30 | C-1 20 | C-1 5 | C-1 15 | — | — | — |
| Inorganic filler (D) | — | — | D-1 15 | D-1 5 | D-2 20 | — | D-1 15 |
| Properties | | | | | | | |
| Flexural modulus (kg/cm², 23° C.) | 24,500 | 22,500 | 30,800 | 23,800 | 27,500 | 16,000 | 30,000 |
| Izod impact strength with notch (kg · cm/cm) | 4.0 | 4.5 | 4.6 | 3.6 | 4.9 | 2.1 | 5.5 |
| Tensile break strength | | | | | | | |
| Non weld portion (kg/cm²) | 321 | 259 | 545 | 391 | 203 | 327 | 540 |
| Weld portion (kg/cm²) | 330 | 262 | — | — | 151 | — | — |
| Appearance of molded | Very good | Very good | Good | Good | Good | Very good | Bad |

What is claimed is:

1. A polypropylene resin composition which comprises 45-85% by weight of (A) a crystalline polypropylene, 10-20% by weight of (B) a polypropylene modified with an unsaturated carboxylic acid or an acid anhydride thereof, and 5-35% by weight of (C) zinc oxide whiskers which have a tetrapod-formed crystal structure.

2. A polypropylene resin composition which comprises 45-85% by weight of (A) a crystalline polypropylene, 10-20% by weight of (B) a polypropylene modified with an unsaturated carboxylic acid or an acid anhydride thereof, 5-35% by weight of (C) zinc oxide whiskers which have tetrapod-formed crystal structure, and 40% or less by weight, based on (C), of an inorganic filler (D) selected from the group consisting of glass fibers, talc and mica, the sum of (C) and (D) being 45% or less by weight.

* * * * *